March 26, 1935. G. E. BLAKE 1,995,446
FLEXIBLE TUBULAR BODY FOR AUTOMOBILE HEATERS OR THE LIKE
Filed May 7, 1930
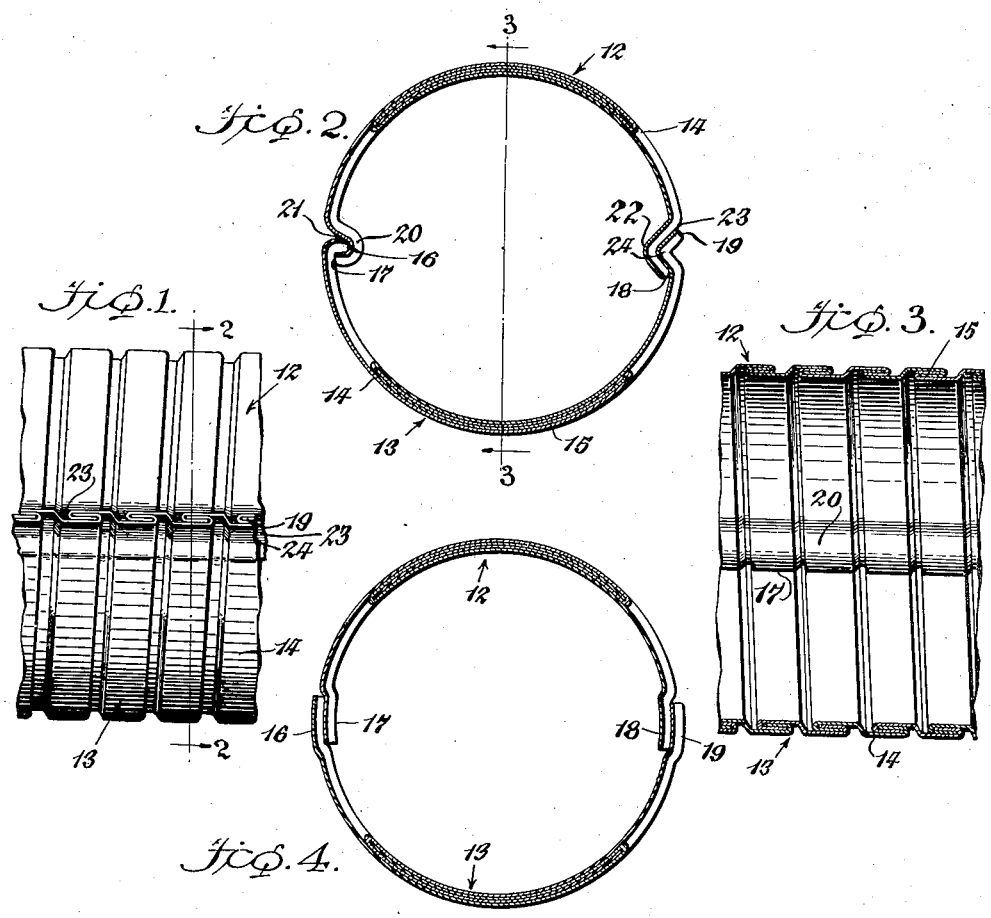
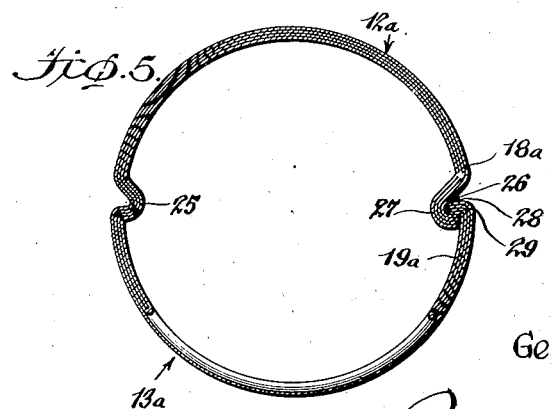
Inventor
George E. Blake,
By Popp and Powers
Attorneys Patented Mar. 26, 1935

1,995,446

UNITED STATES PATENT OFFICE 1,995,446

FLEXIBLE TUBULAR BODY FOR AUTOMOBILE HEATERS OR THE LIKE

George E. Blake, East Aurora, N. Y., assignor to Forsythe Metal Goods Company, Inc., East Aurora, N. Y., a corporation of New York Application May 7, 1930, Serial No. 450,585

31 Claims. (Cl. 137—75)

This invention relates to a flexible body for heaters or the like and more particularly to a flexible body adapted to be employed in the construction of an automobile exhaust heater in which the heat from the exhaust gases of the automobile engine is utilized for heating the interior of the car, although the invention can also be employed in other analogous uses or in any place where it is desirable to apply a body to curved pipes or conduits without taking down the pipe or conduit.

The principal object of this invention is to provide such a split flexible body, which is more particularly intended to form a part of an automobile exhaust heater and in which the body can be applied without taking apart any of the engine connections and particularly the exhaust pipe on which the body is mounted.

A further object is to provide such a body for exhaust heaters or the like which can be applied to curves or bends in the exhaust pipe as readily as straight portions thereof, such bends or curves frequently occurring at the only convenient place where the heater can be installed.

A further object is to provide such a body which can be quickly and readily installed, requires no particular skill, which is strong and durable in construction and will not be affected by the vibration of the automobile or other part to which it is applied, and which is simple and inexpensive in construction.

In the accompanying drawing:

Fig. 1 is a side elevation of a flexible tubular body made in accordance with one form of my invention.

Fig. 2 is a cross section taken on line 2—2, Fig. 1.

Fig. 3 is a longitudinal section taken on line 3—3, Fig. 2.

Fig. 4 is a view similar to Fig. 2 showing another form of my invention.

Fig. 5 is a view similar to Figs. 2 and 4 showing a still further modified form of my invention.

Similar characters of reference indicate like parts in each of the several views of the drawing.

In its general organization this invention comprises a flexible body adapted to form a part of an exhaust heater or the like and adapted to be fitted to the exhaust pipe of an automobile, which heater body is composed of two half sections split at, at least one side to form two half sections which are adapted to be separated or spread apart so that the two sections can be fitted around a pipe or conduit without taking the same down. The body part of the flexible metal tubing is made of one or more helically wound strips which are interlocked at their convolutions so that the body can readily be bent to fit around curves in the pipe or conduit and at the same time is strong and durable in construction.

In the form of the invention shown in Figs. 1–3 the flexible body is composed of two sections 12 and 13 of flexible metal tubing. This tubing is fabricated in the usual manner from one or more strips of metal 14 which are helically wound, the edges of the several turns or convolutions of the strip or strips being interlocked, as indicated at 15 so that a substantially tight tube is provided and at the same time the tube is flexible, the interlocking being so effected as to permit the convolutions of the strips to slide relatively to one another and permit the tube to be flexed in any desired direction.

After being so fabricated the flexible metal tube is cut lengthwise so as to form the two sections 12 and 13 and the edges 16, 17, 18 and 19 at the break between the sections are offset so that an overlapping joint is provided when the sections are brought together and the joined sections are prevented from collapsing. In the form shown in Figs. 1–3 the edge 16 of the section 13 is bent laterally radially inward and the corresponding edge 17 of the section 12 is formed to provide an inwardly extending corrugation 20 which forms an outwardly facing channel 21 receiving the radial flange 16 of the section 13. At its opposite end the section 12 is formed to provide an inwardly extending corrugation 22 at its edge 18 which corrugation forms an outwardly facing channel 23. The corrugation 22 is preferably V-shaped as compared with the rounded channel 20 at the edge 17. Into the channel 23 is fitted an inwardly projecting corrugation 24 formed at the edge 19 of the section 13.

When tubing is formed at its edges in this manner, the radially inturned end 16 of the section 13 is first fitted into the channel 21 at the end 17 of the section 12. Upon then pressing the sections together the corrugation 24 of the section 13 rides over the end 18 of the section 12 and snaps into place in the channel 23 of the section 12. In this manner a strong and durable tubular body is provided which will not readily collapse when pressure is applied to it.

It is apparent that when fitting such a body to an exhaust pipe of an automobile, for example, it is unnecessary to take down the pipe and the two sections to be fitted about the pipe and connected in the manner described without interfering with any permanent part of the automobile. At the same time by reason of the flexibility of the body, provided by making it of helically wound interlocked strips, the completed body and the two sections are freely flexible so that the body may be fitted around bends or curves in the exhaust pipe or other conduit to which it is applied.

In the form of the invention shown in Fig. 4, the ends 17 and 18 of the section 12 are offset inwardly but continue in the same direction as the body part of each section. In the same manner the edges 16 and 19 of the section 13 are offset outwardly to extend in the same direction as the body of the section 13. By so offsetting the edges the two sections can be brought together and form a non-collapsible tubular body although this form cannot be applied with the same ease as the form shown in Fig. 2.

In Fig. 5 is illustrated another form of the invention. In this form the sections 12ª and 13ª are integrally connected together by a hinge 25 which is formed by indenting a longitudinal corrugation at one side of the uncut flexible metal tube. The opposite side of the flexible metal tube is then slit longitudinally as indicated at 26 and the end 18ª of the section 12ª is bent to form a longitudinal inwardly extending corrugation 27 along the edge of the break 26. This corrugation forms a channel 28 which receives the radially inturning edge or end 29 of the end 19ª of the section 13ª. In this form the two sections 12ª and 13ª are opened up, the same bending at the corrugation or hinge connection 25, the two sections are placed around the exhaust pipe or other conduit and the two sections are then brought together and the flange 29 is sprung into engagement with the channel 28 so as to form a non-collapsible tubular body.

After the sections are bent together about an object, a conduit or exhaust pipe as described, they can be secured in any suitable manner.

In all of the forms of the present invention a simple and inexpensive flexible tubular body is provided, which by reason of being split, can be applied to a conduit without removing the conduit or dismantling any part of the same. It can therefore be quickly installed and by reason of its flexibility can be fitted to curves or bends in the conduit as easily as two straight sections thereof. While I have described the present invention with reference to an automobile exhaust heater it is apparent that the invention has other analogous uses, such as in sheathing insulated steam and water pipes.

I claim as my invention;

1. An article of manufacture, comprising two semi-cylindrical flexible metal sections each composed of a plurality of semi-circular strips interlocked at their side edges, the edges of one of said strips being offset laterally to form radially opening channels and one of the edges of the other section being formed to provide a flange fitting into one of said channels while the other edge thereof is formed to provide a corrugation which is adapted to ride over the edge of the other of said channels and fit into said other channel.

2. An article of manufacture, comprising two semi-cylindrical flexible metal sections each composed of a plurality of semi-circular strips interlocked at their side edges, the edges of one of said strips being offset laterally to form radially outwardly opening channels and one of the edges of the other section being formed to provide an inwardly extending flange fitting into one of said channels while the other edge thereof is formed to provide an inwardly extending corrugation which is adapted to ride over the edge of the other of said channels and fit into said other channel.

3. An article of manufacture, comprising two semi-cylindrical flexible metal sections each composed of a plurality of semi-circular strips interlocked at their side edges, one of the edges of one of said sections being offset inwardly to form a rounded outwardly facing channel, while the other edge thereof is offset inwardly to form a comparatively wide outwardly facing V-shaped channel and one of the edges of the other section being formed to provide an inwardly extending flange fitting into said rounded channel while the other edge thereof is formed to provide an inwardly extending V-shaped corrugation which is adapted to ride over the edge of said first section and fit into said V-shaped channel.

4. A metallic conduit formed of a plurality of movably interlocked convolutions and comprising a plurality of removably interlocked sections, each of said sections when so interlocked being axially and laterally flexible.

5. A metallic conduit formed of a plurality of movably interlocked convolutions and comprising a plurality of removably interlocked sections, each of said sections when so interlocked being axially distensible.

6. A longitudinally split flexible conduit formed of a plurality of movably interlocked convolutions, in which the edges defining the split are removably interlocked.

7. A flexible metallic conduit formed of a helically wound strip, the adjacent convolutions of which are movably interlocked one with the other, said conduit comprising a plurality of longitudinal sections removably interlocked together along their adjacent edges.

8. A flexible tube formed of a helically wound strip split lengthwise of the tube to form a plurality of separable sections, the adjacent edges of said sections being removably interlocked.

9. A flexible tube formed of a helically wound strip split lengthwise of the tube to form a plurality of separable sections, one edge of one section being formed to receive the adjacent edge of another section in interlocked relation.

10. A flexible tube comprising interlocking convolutions, said tube being longitudinally separated to form a plurality of separable sections, the adjacent edges of each of said sections being removably interlocked.

11. A flexible metallic conduit formed of a helically wound strip, the adjacent convolutions of which are movably interlocked one with the other, said conduit being split longitudinally, the edges of the conduit defining the split being removable interlocked.

12. A flexible tube formed of a helically wound strip split lengthwise of the tube, one edge defining the split being formed to receive the adjacent edge in removable interlocked relation.

13. A flexible metallic tube formed of a helically wound strip split lengthwise of the tube, one of the edges defining the split being formed to provide a seat extending lengthwise of the tube, the adjacent edge being insertable in said seat to removably interlock the edges together.

14. A flexible metallic tube formed of a helically wound strip, the adjacent convolutions of which are movably interlocked one with another, said conduit being split longitudinally, one of the edges defining the split being bent inwardly of the conduit to form a locking flange, the material adjacent the other of said edges having a gutter formed therein for receiving the flange in removable interlocked relation.

15. A flexible metallic conduit formed of a helically wound strip, the adjacent convolutions of which are movably interlocked one with another, said conduit being split longitudinally and the edges of the conduit defining the split being removably interlocked, a portion of one of said edges overlying the conduit material adjacent said other edge.

16. As a unitary structure, a laterally flexible metallic tube split lengthwise on but one side, the edges defining the split being removably interlocked.

17. As a unitary structure, a laterally flexible metallic tube split lengthwise, said tube being deformed in a line substantially parallel to the edges defining said split to facilitate spreading of the tube.

18. As a unitary structure, a laterally flexible tube split lengthwise, the edges defining the split being removably interlocked, said tube being deformed in a line substantially parallel to the edges defining the split to facilitate spreading of the tube.

19. As a unitary structure, a laterally flexible metallic tube split lengthwise on but one side, the edges defining the split being removably interlocked, a portion of one of said edges overlying the tube material adjacent said other edge.

20. A laterally flexible tube split lengthwise having a depression extending substantially lengthwise thereof to facilitate spreading of the tube.

21. A laterally flexible tube split lengthwise, the edges defining the split being removably interlocked, said tube having a depression extending substantially lengthwise thereof to facilitate spreading of the tube.

22. A flexible metallic conduit formed of a helically wound strip, the adjacent convolutions of which are movably interlocked one with the other, said conduit being split longitudinally, the edges of the conduit defining the split being removably interlocked, a wall of the conduit being deformed along a line substantially parallel to the said split to facilitate spreading the conduit.

23. A flexible tube formed of a helically wound strip, split lengthwise of the tube, and having a flexible portion extending substantially parallel to the edges defining the split.

24. A flexible metallic conduit formed of a helically wound strip split lengthwise of the conduit and having a depression extending substantially lengthwise thereof to facilitate spreading of the conduit.

25. A flexible metallic conduit formed of a helically wound strip split lengthwise of the conduit and deformed in a line substantially parallel to the edges defining said split to facilitate spreading of the conduit.

26. A flexible metallic conduit formed of a helically wound strip, the adjacent convolutions of which are movably interlocked one with another, said conduit being split longitudinally, and having a depression extending substantially lengthwise thereof to facilitate spreading of the conduit.

27. An article of manufacture comprising a helically wound strip having the edges of its convolutions interlocked to form a flexible tubular body, said body being slit only on one side from end to end, the body of the tubing diametrically opposite the slit being formed with a depression therein to provide a hinge for the tubing whereby the tubing may be spread open longitudinally, and complementary interlocking means along the marginal edges of said slit for locking the edges together to make a continuous tubular body.

28. An article of manufacture comprising a helically wound strip having the edges of its convolutions interlocked to form a flexible tubular body, said body being slit only on one side from end to end, the body of the tubing diametrically opposite the slit being formed with a depression therein to provide a hinge for the tubing whereby the tubing may be spread open longitudinally, one marginal edge of the slit tubing along one marginal edge being bent downwardly and the other marginal edge being bent upwardly and interlocking with the bent edge on the first marginal edge for holding the tubing together in tubular form and preventing spreading thereof.

29. An article of manufacture comprising a helically wound strip having the edges of its convolutions interlocked to form a flexible tubular body, said body being slit only on one side from end to end, the body of the tubing diametrically opposite the slit being formed with at least one depression therein to provide a hinge for the tubing whereby the tubing may be spread open longitudinally, complementary interlocking means along the marginal edges of said slit for locking the edges together to make a continuous tubular body, one marginal edge of the tubing along the slit being provided with a flattened portion inwardly of the said edge to permit easy engagement and disengagement of the complementary means.

30. An article of manufacture comprising a helically wound strip having the edges of its convolutions interlocked to form a flexible tubular body, said body being slit only on one side from end to end, the body of the tubing diametrically opposite the slit being formed with a depression therein to provide a hinge for the tubing whereby the tubing may be spread open longitudinally, one marginal edge of the slit tubing along one marginal edge being bent downwardly and the other marginal edge being bent upwardly and interlocking with the bent edge on the first marginal edge for holding the tubing together in tubular form and preventing spreading thereof, one marginal edge of the tubing along the slit being provided with a flattened portion inwardly of the said edge to permit easy engagement and disengagement of the complementary means.

31. An article of manufacture comprising a helically wound strip having the edges of its convolutions interlocked to form a flexible tubular body, said body being slit only on one side from end to end, the body of the tubing diametrically opposite the slit being formed with at least one depression therein to provide a hinge for the tubing whereby the tubing may be spread open longitudinally, one marginal edge along the slit being provided with a projecting portion and the other marginal edge being deformed to provide a recess which receives the projection for interlocking the marginal edges together.

GEORGE E. BLAKE.